United States Patent
Yin et al.

(10) Patent No.: US 10,113,924 B2
(45) Date of Patent: Oct. 30, 2018

(54) PLASMONIC NANOPARTICLE-BASED COLORIMETRIC STRESS MEMORY SENSOR

(71) Applicant: The Regents of The University of California, Oakland, CA (US)

(72) Inventors: Yadong Yin, Riverside, CA (US); Xiaogang Han, Riverside, CA (US); Yiding Liu, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 26 days.

(21) Appl. No.: 15/301,854

(22) PCT Filed: Apr. 6, 2015

(86) PCT No.: PCT/US2015/024456
§ 371 (c)(1),
(2) Date: Oct. 4, 2016

(87) PCT Pub. No.: WO2015/154063
PCT Pub. Date: Oct. 8, 2015

(65) Prior Publication Data
US 2017/0176272 A1    Jun. 22, 2017

Related U.S. Application Data

(60) Provisional application No. 61/975,423, filed on Apr. 4, 2014.

(51) Int. Cl.
*G01J 3/42*    (2006.01)
*G01L 1/24*    (2006.01)
(Continued)

(52) U.S. Cl.
CPC .............. *G01L 1/247* (2013.01); *B82Y 20/00* (2013.01); *B82Y 30/00* (2013.01)

(58) Field of Classification Search
CPC ......... G01L 1/247; B82Y 20/00; B82Y 30/00; B01B 11/16; B01B 11/18; G01P 15/0802; G01P 15/125
(Continued)

(56) References Cited

U.S. PATENT DOCUMENTS

| | | | |
|---|---|---|---|
| 7,718,950 B2 | 5/2010 | Saraf | |
| 2005/0175507 A1* | 8/2005 | Tsukruk | B01D 67/0069 422/68.1 |

(Continued)

FOREIGN PATENT DOCUMENTS

| | | |
|---|---|---|
| CN | 101124061 A | 2/2008 |
| CN | 101198851 A | 6/2008 |

(Continued)

OTHER PUBLICATIONS

Correa-Duarte, M. A. et al."Optical Strain Detectors based on Gold/Elastomer Nanoparticulated Films" Gold Bulletin, vol. 40, No. 1, 2007, pp. 6-14.
(Continued)

*Primary Examiner* — Hina F Ayub
(74) *Attorney, Agent, or Firm* — Buchanan Ingersoll & Rooney PC

(57) ABSTRACT

The development of a stress-responsive colorimetric film that can memorize the stress it has experienced is disclosed. The system can use the plasmonic shift associated with the disassembly of one-dimensional plasmonic nanoparticle chains driven by the plastic deformation of the surrounding polymer matrix. By modifying the plasticity of the polymer, the plasmonic shift and colorimetric change can respond to a large range of stresses. The pressure indicating film can be
(Continued)

used to capture and record the pressure distribution and magnitude between two contacting or impacting surfaces by outputting color information.

20 Claims, 4 Drawing Sheets

(51) Int. Cl.
  *B82Y 20/00* (2011.01)
  *B82Y 30/00* (2011.01)
(58) Field of Classification Search
  USPC .......................................................... 356/320
  See application file for complete search history.

(56) References Cited

U.S. PATENT DOCUMENTS

| | | | |
|---|---|---|---|
| 2008/0123078 | A1 | 5/2008 | Saraf |
| 2008/0191177 | A1 | 8/2008 | Mainwaring et al. |
| 2008/0295646 | A1 | 12/2008 | Mirkin et al. |
| 2009/0114033 | A1* | 5/2009 | Xu .......................... G01L 1/241 73/800 |
| 2009/0122829 | A1 | 5/2009 | Perez-Luna et al. |
| 2009/0145347 | A1 | 6/2009 | Nakamura et al. |
| 2009/0304905 | A1 | 12/2009 | Graham et al. |
| 2010/0133489 | A1 | 6/2010 | Mirkin et al. |
| 2013/0148194 | A1* | 6/2013 | Altug ................... G01N 21/554 359/350 |
| 2014/0013864 | A1 | 1/2014 | Hickenboth et al. |

FOREIGN PATENT DOCUMENTS

| | | |
|---|---|---|
| CN | 101400977 A | 4/2009 |
| WO | 2006/126771 A1 | 11/2006 |

OTHER PUBLICATIONS

Extended European Search Report dated Oct. 13, 2017, issued by the European Patent Office in corresponding European Application No. 157722568.7-1557 (11 pages).
Ge, J, et al. "Superparamagnetic Magnetite Colloidal Nanocrystal Clusters"; Angewandte Chemie International Edition vol. 46, No. 23; pp. 4342-4345, 2007.
Lu, Z, et al. "Direct Assembly of Hydrophobic Nanoparticles to Multifunctional Structures"; Nano Letters vol. 11, No. 8; pp. 3404-3412; 2011.
Nie, Z, et al. "Properties and Emerging Applications of Self-Assembled Structures Made from Inorganic Nanoparticles"; Nature Nanotechnology vol. 5, No. 1; pp. 15-25; 2010.
Ge, J, et al. "Highly Tunable Superparamagnetic Colloidal Photonic Crystals"; Angewandte Chemie; vol. 119, No. 39; pp. 7572-7575; 2007.
Anker, J.N., et al. "Biosensing with Plasmonic Nanosensors"; Nature Materials vol. 7, No. 6; pp. 442-453; 2008.
Rycenga, M., et al. "Controlling the Synthesis and Assembly of Silver Nanostructures for Plasmonic Applications"; Chemical Reviews; vol. 111, No. 6, pp. 3669-3712; 2011.
Lin, S., et al. "One-Dimensional Plasmon Coupling by Facile Self-Assembly of Gold Nanoparticles into Branched Chain Networks"; Advanced Materials; vol. 17, No. 21; pp. 2553-2559; 2005.
Zhang, H., et al. "Controlling the Growth of Charged-Nanoparticle Chains through Interparticle Electrostatic Repulsion"; Angewandte Chemie; vol. 120, No. 21; pp. 4048-4051; 2008.
Yang, M., et al. "Mechanistic Investigation into the Spontaneous Linear Assembly of Gold Nanospheres"; Physical Chemistry, Chemical Physics vol. 12, No. 38; pp. 11850-11860; 2010.
Han, X., et al. "Role of Salt in the Spontaneous Assembly of Charged Gold Nanoparticles in Ethanol"; Langmuir; vol. 27, No. 9; pp. 5282-5289; 2011.
Liu, Y., et al. "Thermoresponsive Assembly of Charged Gold Nanoparticles and their Reversible Tuning of Plasmon Coupling"; Angewandte Chemie International Edition vol. 51, No. 26; pp. 6373-6377; 2012.
Huang, F., "Actively Tuned Plasmons on Elastomerically Driven Au Nanoparticle Dimers"; Nano letters vol. 10, No. 5; pp. 1787-1792; 2010.
Balazs, A., "Nanoparticle Polymer Composites: Where Two Small Worlds Meet"; Science vol. 314 No. 5802; pp. 1107-1110; 2006.
Turkevich, J.,"A Study of the Nucleation and Growth Processes in the Synthesis of Colloidal Gold" Discussions of the Faraday Society 11; pp. 55-75; 1951.
Enustun, B.V., "Coagulation of Colloidal Gold"; Journal of the American Chemical Society; vol. 85, No. 21; pp. 3317-3328.
Sun, Y., "Shape-Controlled Synthesis of Gold and Silver Nanoparticles"; Science 298.5601 (2002): 2176-2179.
Gao, C., et al. "One-Step Seeded Growth of Au Nanoparticles with Widely Tunable Sizes"; Nanoscale vol. 4 No. 9; pp. 2875-2878; 2012.
Gamze, U., et al. "Spectrophotometric Determination of Risedronate Sodium in Pharmaceutical Preparations by Derivative and Continuous Wavelet Transforms"; vol. 27, No. 4; pp. 215-233.
Esteban, R., et al. "How Chain Plasmons Govern the Optical Response in Strongly Interacting Self-Assembled Metallic Clusters of Nanoparticles" Langmuir vol. 28, No. 24; pp. 8881-8890; 2012.
Feldstein, M., et al. "Coherence of Thermal Transitions in Poly (N-vinyl pyrrolidone)—poly (ethylene glycol) compatible blends 1. Interrelations among the Temperatures of Melting, Maximum cold Crystallization rate and glass transition" Polymer vol. 41, No. 14; pp. 5327-5338; 2000.
International Search Report (PCT/ISA/210) dated Jul. 1, 2015, by the USA Patent Office as the International Searching Authority for International Application No. PCT/US2015/024456.
Written Opinion (PCT/ISA/237) dated Jul. 1, 2015, by the USA Patent Office as the International Searching Authority for International Application No. PCT/US2015/024456.
Office Action dated Jul. 3, 2018 in corresponding Chinese Patent Application No. 201580029440.2, and an English translation thereof.

* cited by examiner

PLASMONIC NANOPARTICLE-BASED COLORIMETRIC STRESS MEMORY SENSOR

CROSS-REFERENCE TO RELATED APPLICATIONS

This application claims the benefit of U.S. Provisional Application No. 61/975,423, filed Apr. 4, 2014, the entire contents of which is hereby incorporated herein by reference.

FIELD

The disclosure relates to a plasmonic nanoparticle-based colorimetric stress memory sensor.

BACKGROUND INFORMATION

Colloidal nanoparticles have remained the focus of research mainly due to their strong size- and shape-dependent properties. It has further been realized that the formation of nanoparticle assemblies may conceive new properties unattainable using individual nanoparticles through collective effects such as interparticle coupling and structural ordering. An important feature of such secondary structures is that the properties of nanoparticle ensembles can be dynamically controlled by manipulating the assembly and disassembly behaviors, making them excellent candidates for constructing stimuli-responsive or smart materials. A notable example is colloidal nanoparticles of plasmonic noble metals (e.g. gold and silver), which exhibit localized surface plasmon resonance resulting in significant scattering and absorption in the visible spectrum. The plasmon excitation can be widely tuned by arranging multiple nanoparticles in close proximity, for example, by forming one-dimensional (1D) chain structures, which can take advantage of the interparticle near-field plasmon coupling effect. The dependence of the resonance band position on the interparticle separation can provide many great opportunities for developing novel stimuli responsive colorimetric devices.

SUMMARY

In accordance with an exemplary embodiment, a plasmonic nanoparticle-based colorimetric stress memory sensor is disclosed, the sensor comprising: a stress-responsive colorimetric film configured to memorize a stress the film has experienced using a plasmonic shift associated with the disassembly of plasmonic nanoparticle chains driven by a plastic deformation of a surrounding polymer matrix.

In accordance with an exemplary embodiment, a plasmonic nanoparticle-based colorimetric stress memory sensor is disclosed, the sensor comprising: a stress-responsive colorimetric film configured to memorize a stress the film has experienced using a plasmonic shift associated with the disassembly of gold nanoparticle (AuNP) chains driven by a plastic deformation of a surrounding polymer matrix. The plasmonic shift reflects an extent of disassembly of the AuNP chains, which depends on the degree of deformation of the film, which in turn is determined by stress intensity duration, and wherein by modifying a plasticity of a polymer of the surrounding polymer matrix, the plasmonic shift and a colorimetric change occur in response to stresses.

In accordance with an exemplary embodiment, the sensor can include a spectrometer, and the film can be used to capture and record the pressure distribution and magnitude between two contacting or impacting surfaces by outputting color information, which can be quantified with the spectrometer.

In accordance with an exemplary embodiment, a method of forming a plasmonic nanoparticle-based colorimetric stress memory sensor is disclosed, the method comprising: preparing bis(p-sulfonatophenyl)-phenylphosphine (BSPP) capped plasmonic nanoparticles; assembling the BSPP capped plasmonic nanoparticles into a chain suspension; mixing polyvinylpyrrolidone (PVP), poly(ethylene glycol) (PEG) and the chain suspension into a homogenous mixture and drop casting the homogenous mixture onto a polydimethylsiloxane (PDMS) substrate; and placing the mixture and substrate in a vacuum desiccator to allow evaporation of the solvent.

In accordance with an exemplary embodiment, the stress-responsive colorimetric film is formed by: preparing bis(p-sulfonatophenyl)-phenylphosphine (BSPP) capped gold nano-particles (AuNPs); assembling the BSPP capped AuNPs into a chain suspension; mixing polyvinylpyrrolidone (PVP), poly(ethylene glycol) (PEG) and the chain suspension into a homogenous mixture and drop casting the homogenous mixture onto a polydimethylsiloxane (PDMS) substrate; and placing the mixture and substrate in a vacuum desiccator to allow the evaporation of ethanol.

BRIEF DESCRIPTION OF THE DRAWINGS

The disclosure is explained below with reference to the exemplary embodiment shown in the drawing. In the drawing:

FIGS. 2a-2c shows fabrication of the composite film and its pressure-responsive color switching performance, wherein FIG. 2a is an illustration of film fabrication procedure and compression test results; and FIGS. 2b and 2c are normalized UV-Vis extinction profiles for films before/after pressing (FIG. 2b) and the nanoparticle suspensions recovered from both (FIG. 2c).

FIG. 3a shows the UV-Vis extinction spectra of a typical composite film after experiencing different pressures for a fixed application time (1 min).

FIG. 3b shows the continuous wavelet transform (CWT) of the spectra in FIG. 3a.

FIG. 3c shows physical deformation profiles of the film after being subjected to various pressures for 1 minute.

FIG. 3d is a plot of coupling peak position shift for films experiencing different pressures and application times (1 min and 5 min).

FIGS. 4a-4d shows tuning the sensitivity of the optical change to stress by doping the composite film with plasticizer, wherein FIG. 4a shows UV-Vis extinction spectra (left) and their CWT profiles (right) for films doped with different amounts of PEG before (dot) and after (line) being treated with $1.6 \times 10^4$ psi of pressure for 1 minute; FIG. 4b is a plot of pressure-dependent coupling peak shift for films doped with different amounts of PEG (press time is 1 min); FIG. 4c are digital images of films doped with 11 wt % PEG after experiencing different pressures for 1 min; and FIG. 4d are deformation profiles of films without and with 17 wt % PEG doping under different pressures for 1 min.

DETAILED DESCRIPTION

The linear assembly of charged gold nanoparticles (AuNPs) into chains in colloidal suspensions are known.

While most investigations have reported on AuNP chains that could not disassemble following their formation, by modifying AuNPs with sufficiently strong ligands to enhance short-range repulsions, AuNPs can be immune from permanent coagulation when they are closely arranged during the assembly process. As a result, by harnessing the colloidal interactions via external stimuli (for example, chemical addition and temperature change), AuNPs can be assembled and disassembled in a controlled manner so that responsive color switching can be realized.

In accordance with an exemplary embodiment, an AuNP chain-polymer composite film, which shows a colorimetric response to mechanical forces and can "memorize" the stress it has experienced is disclosed. In accordance with an exemplary embodiment, the design can take advantage of the intensity and time dependent viscous flow of polymeric materials in response to mechanical stress. Such deformation can lead to the disassembly of embedded AuNP chains and can cause a shift of the plasmonic band, which can be correlated to the applied mechanical stress.

Figure 1:
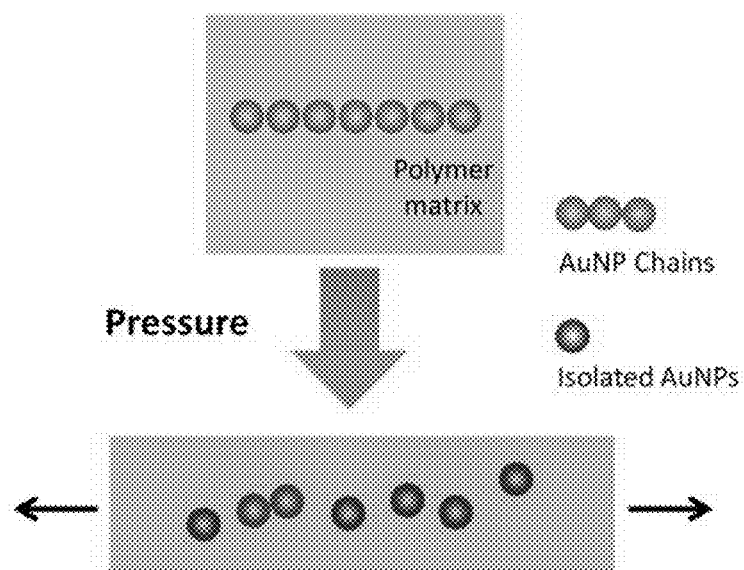
FIG. 1 shows a schematic illustration of the design of the stress-responsive colorimetric film based on disassembly of gold nanoparticle chains in a polymer flow in accordance with an exemplary embodiment.

FIG. 1 illustrates the working principle in accordance with an exemplary embodiment. AuNP chains are first homogeneously mixed with a polymer solution and then cast in a solid composite film. After being subjected to sufficient pressure for a certain period of time, the composite film can be irreversibly deformed. By treating viscoelastic polymers as governed by the Kelvin-Voigt Model and regarding the viscous component as an ideal dashpot, which can obey Newton's law of viscosity, the relationship between the stress and irreversible viscous deformation can be obtained as:

$$\varepsilon(t_0) \int_0^{t_0} \frac{\sigma(t)}{\eta} dt \quad (1)$$

in which the extent of deformation $\varepsilon$ is proportional to the intensity of applied stress $\sigma$ and its duration time $t_0$, and is inversely proportional to the viscosity of the material $\eta$. During film deformation, the homogeneously embedded AuNP chains can be stretched accordingly, resulting in an increase of the interparticle distance, a weakening of the plasmon coupling, and a change in the overall color of the film. The recorded position of the plasmon band can be then correlated to the extent of film deformation, which is proportional to the stress that has been applied, thus producing a stress memory colorimetric sensor.

Figure 2:
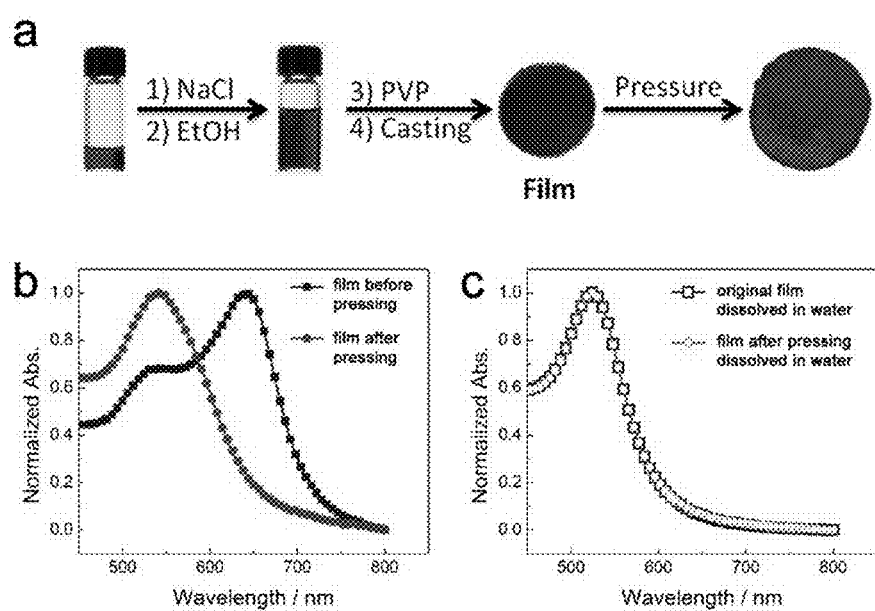

FIG. 2a outlines the procedure for fabricating the AuNP chain-polymer composite film. Citrate-capped AuNPs with a size of about 15 nm were first synthesized by a slightly modified Turkevich method. A ligand exchange process was then performed to introduce bis(p-sulfonatophenyl)-phenylphosphine (BSPP), a stronger ligand compared to citrate, to the surface of the AuNPs. BSPP-capped AuNPs were then assembled into linear chains in ethanol by adding a trace amount of NaCl, changing the solution color from ruby red to blue. NaCl addition increased the ionic strength of the solution, resulting in the screening of the electrostatic repulsion between particles and triggering the assembly. Polyvinylpyrrolidone (PVP, M.W.=360,000) was then dissolved in the solution of AuNP chains to form a viscous suspension, which can be cast onto a glass substrate to produce a composite film after slow removal of the solvent by evaporation.

In accordance with an exemplary embodiment, PVP with high molecular weight was chosen as the polymer matrix due to its high solubility in water and ethanol, low optical absorption in visible range, and its ability to form good films. PVP also acts as an additional capping agent for the AuNPs and can ensure their homogeneous dispersion in the matrix without significant disturbance to the chain structure. In addition, as disclosed, the adhesion arising from the coordinate bonding between pyrrolidone groups and the Au surface can facilitate the disassembly of the AuNPs during the deformation of the PVP matrix.

Similar to solutions of AuNP chains, the as-prepared AuNP-PVP composite film can display a deep blue color. Its visible light absorption spectrum presents a strong coupling peak at 650 nm, which demonstrates that the AuNPs maintain the chain structure in the composite (FIG. 2b). The films were very stable, as the color and the optical extinction profile remained nearly unchanged after 30 days of storage at 4° C. at 50% humidity. After applying a strong pressure (for example, $1.6 \times 10^5$ psi) to the film for 1 min, its color clearly changed from blue to ruby red. The visible extinction spectrum of the composite film after pressing displays a single absorption peak with a small shoulder at around 530 nm, which corresponds to the transverse mode of the plasmon resonance (FIG. 2b). To exclude the effect resulting from the shape change of AuNPs during pressing, we compared the extinction profile and morphology of the AuNPs recovered from the films before and after pressing, by first dissolving the films in water and then taking optical and TEM measurements. The extinction profiles of the AuNPs recovered from both films are nearly identical and show a characteristic absorption peak for isolated AuNPs at around 520 nm (FIG. 2c), while the TEM images also confirm the unchanged morphologies of AuNPs after pressing. In addition, pressing tests on films containing only isolated AuNPs, found no change in the position of the plasmon band before, and after pressing were also performed. These control experiments suggest that the plasmon band shift can be solely ascribed to the disassembly of AuNP chains during film deformation.

Figure 3:
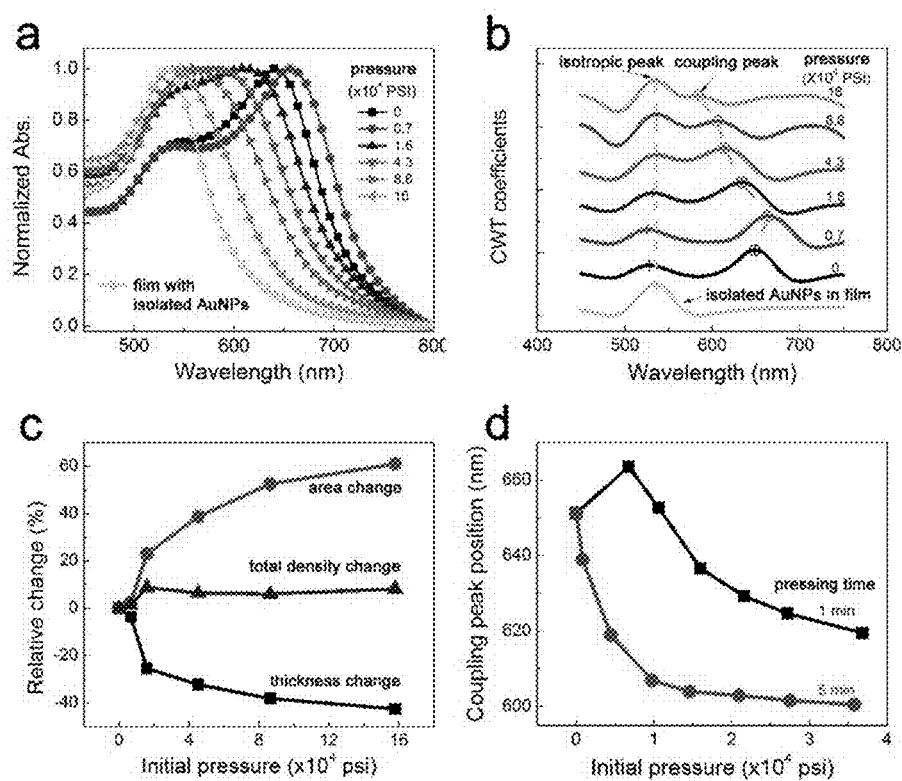

As indicated in Equation 1, at a fixed viscosity, which can be determined intrinsically by the polymer matrix, the irreversible viscous deformation of the composite film can be expected to increase with respect to an increase in the intensity and duration of the applied stress. Accordingly, disassembly of AuNP chains should occur due to the considerably strong adhesion between PVP and the AuNPs, leading to a color shift of the film in response to the changes in these two parameters. To verify this assumption, different pressures ($7 \times 10^3$, $1.6 \times 10^4$, $4.3 \times 10^4$, $8.6 \times 10^4$, and $1.6 \times 10^5$ psi) were applied to a batch of composite films for the same period of time (1 min). After pressing, the change in optical property and the deformation of the films were investigated. In accordance with an exemplary embodiment, as expected, the plasmon coupling band generally blue-shifted and dampened with increasing applied pressure (FIG. 3a). Under a relatively high pressure, the coupling peak became indistinguishable and overlapped with the isotropic plasmon band of isolated AuNPs at around 530 nm. To unambiguously measure the changes in the plasmon band positions, the spectra by virtue of continuous wavelet transform (CWT) were analyzed, which has been demonstrated to be a powerful and reliable method for analysis of overlapping signals. By applying the transformation, the spectra reveal a clearer trend in the optical change of the films (FIG. 3b). As shown in FIG. 3c, the area of the film expanded with increasing pressure to become 61% greater than originally, while the thickness decreased by 42%. As a result, the density of the film was enhanced slightly (less than (<) 8%) upon the application of a small amount of pressure, but remained nearly unchanged at higher pressures. The initial density increase may be primarily attributed to the elastic deformation of the polymer film under a mild pressure. FIG. 3d plots the dependence of the coupling peak position on the pressure applied on the film for fixed amounts of time. In general, the extent of the blue shift and dampening of the coupling peak increase with greater film deformation, which is consistent with the theoretical considerations: more deformation causes a larger displacement of the AuNPs and enhances the interparticle separation, which promotes a larger plasmon band shift. Interestingly, however, it is noted that when a mild stress is applied for a relatively short period of time (for example, $7 \times 10^3$ psi for 1 min), the coupling peak surprisingly red-shifts from 649 nm to 664 nm. This red-shift can be attributed to elastic deformation, which occurs at the early stages of pressing and causes more significant vertical compression (approximately 3.7% change in thickness) and less lateral expansion (2.4% change in area). For example, the compaction of the film can reduce the average interparticle distance and at the same time enhances the degree of one-dimensional order within each AuNP chain, leading to stronger coupling at longer wavelengths. At higher pressures, inelastic deformation dominates so that the band attributed to plasmonic coupling continues to blue shift as more polymer flow occurs in the lateral dimension. It is worth noting that the band at approximately 530 nm also slightly red shifts, indicating the formation of an increasing number of isolated AuNPs after compression at higher pressures. When keeping the applied pressure constant and prolonging the stress application time from 1 min to 5 min, the coupling peak blue shifts were found to be more significant, as shown in FIG. 3d. Even under a mild constant pressure, a large band shift and consequently dramatic color change can be observed.

The polymer flow induced disassembly process can be used to construct colorimetric stress sensors that can memorize the mechanical stress experienced by the composite film, as long as the relation between the applied stress at a fixed duration and the band position of the plasmon coupling is pre-established for a particular type of composite film. As PVP is relatively hard at room temperature, only applying a sufficiently large stress can induce a considerable irreversible To extend the pressure response range and also increase the stress sensitivity of the composite film, the polymer can be modified by doping with plasticizers to improve its fluidity (or to lower its hardness and viscosity). It is known that PVP is miscible with small molecules containing hydroxyl groups, as the proton-donating —OH groups can form H-bonds with the proton-accepting carbonyl groups in PVP. As a result, by adding these small molecules into PVP, the packing structure of the polymer chains will be reorganized and its fluidity can be improved.

Figure 4:
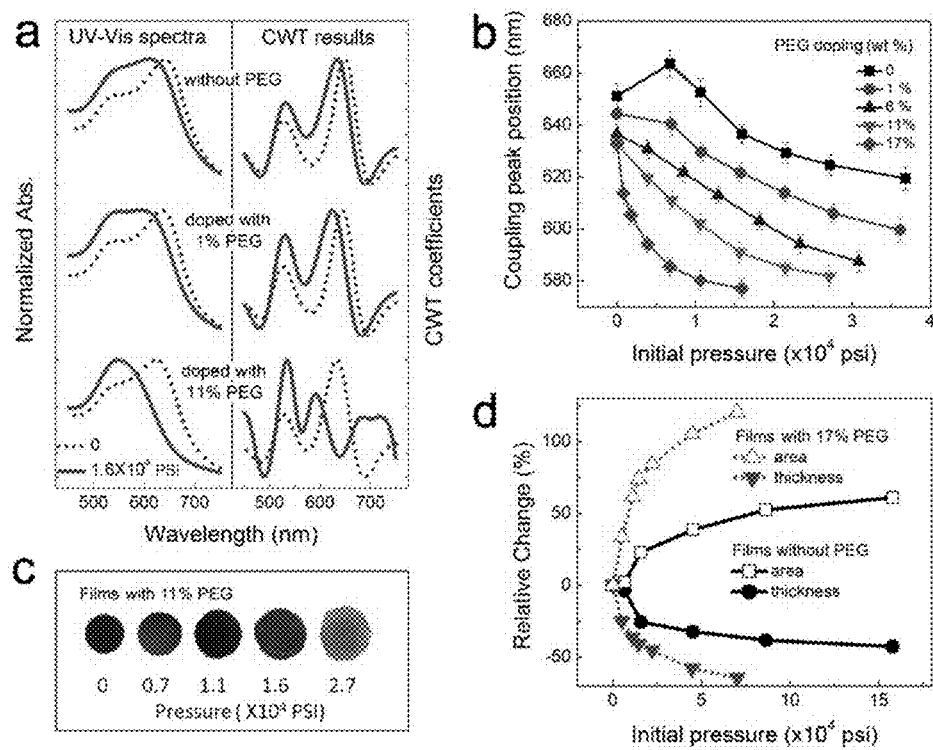

In accordance with an exemplary embodiment, a short-chain poly(ethylene glycol) (typically PEG-400) was chosen as the plasticizer, which mixed well with PVP and at the same time avoided significant interference to the chain structure of the AuNPs. With increasing addition of PEG-400, the deformation of the polymer composite film becomes more sensitive to the external pressure, as reflected in the optical property change of the polymer composite. By keeping the pressure ($1.6 \times 10^4$ psi) and the application duration (1 min) fixed, the color change and physical deformation for films doped with various amounts of PEG were examined. As shown in FIG. 4a, while the sample without PEG only showed a slight blue shift of the coupling peak from approximately 649 nm to approximately 635 nm, the addition of PEG led to more significant changes in response to the compression, with the coupling peak shifting from approximately 646 nm to approximately 627 nm (for the case of 1 wt % PEG) and from approximately 636 nm to approximately 591 nm (for the case of 11 wt % PEG). The results show that the disassembly of AuNP chains in the polymer film can be more significant with greater PEG doping.

The dependence of the optical property on the applied pressure for composite films doped with different amounts of PEG (1-17 wt %, FIG. 4b and FIG. 4c) was also systematically investigated. Samples doped with more than 17 wt % of PEG became too fluidic to form freestanding films with defined shapes. As shown in FIG. 4b, while the film without PEG exhibits significant optical responses only at relatively high pressures, those containing PEG show a considerable shift in coupling peak position under much lower pressures. For comparison, while a pressure of $1.6 \times 10^5$ psi is needed for shifting the coupling peak of the film without PEG to approximately 583 nm, only $\frac{1}{10}$ of the pressure ($1.6 \times 10^4$ psi) is sufficient to shift the coupling peak to approximately 577 nm for the sample doped with 17 wt % PEG. Analysis of the physical deformation of the films suggests that the deformation sensitivity also increases with PEG-doping amount, as suggested in FIG. 4c. It was also found that the shift of the coupling peak was directly related to the extent of film deformation: for films with different PEG loadings, if they have a similar extent of shift in coupling peak, they also have similar extent of deformation. For example, the film without PEG doping showed a 61% expansion in area and a plasmonic shift to approximately 583 nm after experiencing $1.6 \times 10^5$ psi of pressure, while the one doped with 17 wt % of PEG showed a 66% change in area and a plasmonic shift to approximately 577 nm after being subjected to $1.6 \times 10^4$ psi of pressure. This is in good agreement with the expected relationship between the extent of nanoparticle disassembly and the extent of film deformation. It is therefore clear that by varying the amount of plasticizer, polymer films with different degrees flexibility can be made to detect a wide range of stresses by outputting optical responses.

In accordance with an exemplary embodiment, a stress-responsive colorimetric film that can memorize the stress it has experienced by taking advantage of the plasmonic shift associated with the disassembly of 1D AuNP chains driven by the plastic deformation of the surrounding polymer matrix is disclosed. The plasmonic shift reflects the extent of disassembly of the AuNP which can depend on the degree of deformation of the film, which in turn is determined by the stress intensity duration. By modifying the plasticity of the polymer, the plasmonic shift and colorimetric change may occur in response to a large range of stresses. The pressure indicating film can be used to capture and record the pressure distribution and magnitude between two contacting or impacting surfaces by outputting color information, which can be quantified with the help of a spectrometer. The disclosure also can demonstrate that not only the nanoparticle assembly process but also the reverse process may be utilized to design novel materials and devices with unique properties and functions.

EXPERIMENTAL SECTION

Synthesis of AuNPs:

BSPP-capped AuNPs were prepared using a process reported in previous work, See, Han, X.; Goebl, J.; Lu, Z.; Yin, Y. *Langmuir* 2011, 27, 5282. An aqueous solution of hydrogen tetrachloroaurate trihydrate (0.02 wt %, 95 mL) was heated to reflux with magnetic stirring, followed by the quick injection of 5 mL of fresh trisodium citrate solution (1 wt %). The aurate-citrate solution was allowed to reflux for 20 min while the color of the solution changed from pale yellow to ruby red, indicating the formation of citrate-capped AuNPs. The AuNP suspension was then cooled down to room temperature, mixed with 20 mg of BSPP, and gently stirred for 4 hour. After ligand exchange, the BSPP-capped AuNPs were washed by repeated centrifugation and redispersion in deionized water 3 times, and finally dispersed in 1 mL of deionized water.

Assembly of AuNP Chains:

Assembly of AuNPs into chains was performed according to a previously reported protocol, See, Han, X.; Goebl, J.; Lu, Z.; Yin, Y. *Langmuir* 2011, 27, 5282. An aqueous solutions of NaCl (3 µL, 1.0 M) and 200 proof ethanol (900 µL) was sequentially added into an AuNPs stock solution (100 µL). After gentle shaking, the suspension was allowed to stand for 1 h to enable the formation of AuNP chains.

Fabrication of AuNP-Polymer Composite Films:

Typically, PVP (0.10 g, M.W.=360,000) and a desired amount of PEG were carefully mixed with the AuNP chain suspension (1 mL) to form a homogeneous mixture. The mixture was then drop cast onto a polydimethylsiloxane (PDMS) substrate and placed in a vacuum desiccator for 24 hours to allow the evaporation of ethanol. Solid films were then peeled off from the substrate and cut into small pieces of 3 $mm^2$ with circular shapes using a homemade puncher.

Compression Tests:

Samples were loaded into a pressing die and constant forces were applied onto the die by using a compressor with a force gauge. The pressure applied on the sample was then calculated by dividing the force by the initial sample area.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A plasmonic nanoparticle-based colorimetric stress memory sensor, the sensor comprising:
a stress-responsive colorimetric film configured to memorize a stress the film has experienced using a plasmonic shift associated with a disassembly of one-dimensional plasmonic nanoparticle chains driven by a plastic deformation of a surrounding polymer matrix.

2. The sensor of claim 1, wherein the plasmonic nanoparticles are composed of gold, silver, copper, or alloys of gold, silver, or copper.

3. The sensor of claim 1, wherein the plasmonic shift reflects an extent of disassembly of the plasmonic nanoparticle chains, which depends on the degree of deformation of the film, which in turn is determined by stress intensity and duration.

4. The sensor of claim 3, wherein by modifying a plasticity of a polymer of the surrounding polymer matrix, the plasmonic shift and a colorimetric change occur in response to stresses.

5. The sensor of claim 1, comprising:
a spectrometer, wherein the film is used to capture and record the pressure distribution and magnitude between two contacting or impacting surfaces by outputting color information, which can be quantified with the spectrometer.

6. The sensor of claim 1, wherein the polymer is a mixture of polyvinylpyrrolidone (PVP) and poly(ethylene glycol) (PEG).

7. The sensor of claim 6, wherein the poly(ethylene glycol) of the film is 1 wt % to 17 wt %.

8. A method of forming a plasmonic nanoparticle-based colorimetric stress memory sensor, the method comprising:
preparing bis(p-sulfonatophenyl)-phenylphosphine (BSPP) capped plasmonic nanoparticles;
assembling the BSPP capped plasmonic nanoparticles into a chain suspension;
mixing polyvinylpyrrolidone (PVP), poly(ethylene glycol) (PEG) and the chain suspension into a homogenous mixture and drop casting the homogenous mixture onto a substrate; and
placing the mixture and substrate in a vacuum desiccator to allow evaporation of solvent from the mixture.

9. The method of claim 8, comprising:
removing the film from the substrate.

10. The method of claim 8, wherein the substrate is a polydimethylsiloxane (PDMS) substrate.

11. The method of claim 8, wherein the solvent is ethanol.

12. The method of claim 8, wherein the plasmonic nanoparticles are composed of gold, silver, copper, or alloys of gold, silver, or copper.

13. A colorimetric film, the colorimetric film comprising:
bis(p-sulfonatophenyl)-phenylphosphine (BSPP) capped plasmonic nanoparticles arranged in a chain suspension; and
a polymer matrix of polyvinylpyrrolidone (PVP) and poly(ethylene glycol) (PEG) surrounding the chain suspension of the BSPP capped plasmonic nanoparticles.

14. The colorimetric film of claim 13, wherein the plasmonic nanoparticles are composed of gold, silver, copper, or alloys of gold, silver, or copper.

15. The colorimetric film of claim 13, wherein the poly (ethylene glycol) of the colorimetric film is 1 wt % to 17 wt %.

16. The colorimetric film of claim 13, wherein the chain suspension is one-dimensional (1D).

17. The colorimetric film of claim 13, wherein the plasmonic nanoparticles are gold.

18. A method of forming a plasmonic nanoparticle-based colorimetric stress memory sensor, the method comprising:
preparing plasmonic nanoparticles;
assembling the plasmonic nanoparticles into a chain suspension;
mixing a polymer and the chain suspension into a homogenous mixture and drop casting the homogenous mixture onto a substrate; and
placing the mixture and substrate in a vacuum desiccator to allow evaporation of solvent from the mixture.

19. The method of claim 18, wherein the plasmonic nanoparticles are composed of gold, silver, copper, or alloys of gold, silver, or copper.

20. The method claim 18, wherein the polymer is a mixture of polyvinylpyrrolidone (PVP), poly(ethylene glycol) (PEG).

* * * * *